HARTMAN & PICKERT.

Thill-Coupling.

No. 64,219. Patented Apr. 30, 1867.

Witnesses:
W. H. Hartman
A. B. m Pickert

Inventor:
W. H. Brundy
J. H. Brundy

United States Patent Office

WILLIAM H. HARTMAN AND A. K. M. PICKERT, OF FOSTORIA, OHIO.

*Letters Patent No. 64,219, dated April 30, 1867.*

---

IMPROVEMENT IN ATTACHING THILLS TO CARRIAGES.

---

*The Schedule referred to in these Letters Patent and making part of the same.*

---

TO ALL WHOM IT MAY CONCERN:

Be it known that we W. H. HARTMAN and A. K. M. PICKERT, of Fostoria, in the county of Seneca, and State of Ohio, have invented certain new and useful Improvements in Carriage-Shaft Couplings; and we do hereby declare that the following is a full and complete description of the construction and operation of the same, reference being had to the accompanying drawings, making a part of this specification, in which—

Like letters of reference refer to like parts in the views.

Figure 1:
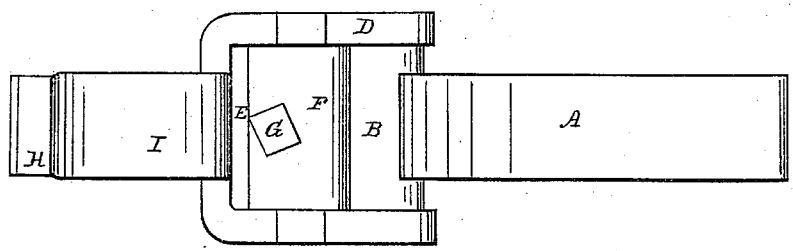
Figure 1 is a top view of the coupling.
Figure 2:
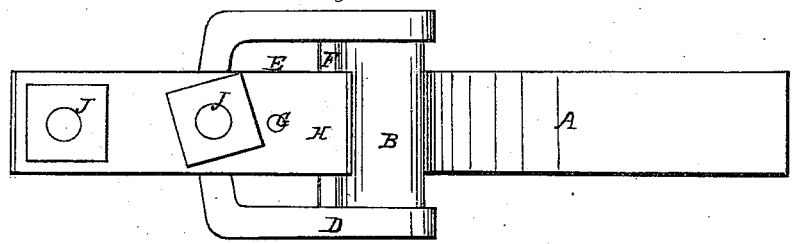
Figure 2 is an under-side view.
Figure 3:
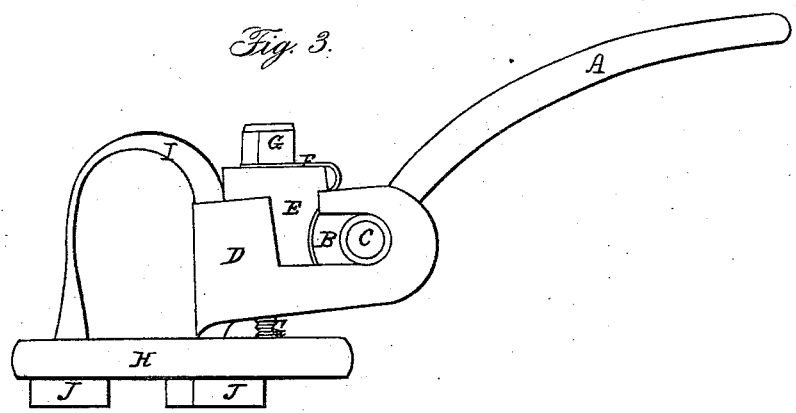
Figure 3 is a side view.

A, fig. 1, is the reach, to which the shafts are attached. B, the head of the reach, is provided with a pivot, C, one at each side. This head is made to fit between the arms of the stay D, and moves upon the pivots which are fitted to the slots cut in the sides of the stay, as shown in fig. 3. In order to prevent the pivots from being displaced on the backing of the carriage the head of the reach is backed up by the block of rubber E, which is placed between the head of the reach and back of the stay. F is a guard, which consists of a piece of brass or other metal interposed between the rubber and head, whereby the rubber is prevented from wearing by the friction of the head. It also serves to protect the rubber, and gives greater security to its position. This rubber is secured to the stay by the bolt G, which is passed through the guard and rubber, and screwed into the clip-bar H. I is a band, which, together with the bar H, forms the clip, by which the coupling is fastened to the axle of the carriage by passing the band over the axle, and its threaded ends projected through the bar H, and then secured by the nuts J.

The usual manner of coupling the shafts to a carriage is by passing a bolt through the stay and the head of the reach, and then securing the same with one or more nuts. These nuts often become loose and fall off, and the thills in consequence become detached, to the danger of those who may be in the carriage, by the team becoming frightened, &c.; but by this method of coupling it is impossible for the shafts to become detached without special means applied for that purpose, there being no nuts to fall off nor bolts to drop out; hence this coupling is much safer than the old one. The bolts in the old coupling soon become loose by the constant jarring and wearing of the bolts and bolt holes, and when thus loose produce a continual noisy rattling, and are more liable to break by any sudden strain than if they were tight. In the coupling under consideration these difficulties are avoided by the action of the rubber, which, at all times, keeps the pivots close to the slots in which they move; hence, the pivots can never get loose, or the thills become detached.

What we claim as our improvement, and desire to secure by Letters Patent, is—

1. The rubber block E, provided with the guard F, and secured, by means of through-bolt or screw G, to the detached or separate clip-bar H, in combination with the slotted stay D, secured to clip I, in the manner shown and described.

2. The head B, pivots C, and slotted stay D, in combination with the clip I, guard F, screw G, and rubber E, when the several parts are constructed and arranged in relation to each other, in the manner and for the purpose described.

W. H. HARTMAN,
A. K. M. PICKERT.

Witnesses:
W. H. BURRIDGE,
J. H. BURRIDGE.